United States Patent

[11] 3,602,005

| [72] | Inventor | Henry B. Kaye |
| | | 857 Schenck Ave., Brooklyn, N.Y. 11707 |
| [21] | Appl. No. | 874,775 |
| [22] | Filed | Nov. 7, 1969 |
| [45] | Patented | Aug. 31, 1971 |

[54] AUTOMATIC CONTROL FOR AUTOMOTIVE AIR CONDITIONER
2 Claims, 3 Drawing Figs.

[52] U.S. Cl..................................................... 62/230,
62/243, 62/323, 123/117
[51] Int. Cl...................................................... F25b 27/00
[50] Field of Search............................................. 62/228,
230, 243, 244, 323; 123;117.1

[56] References Cited
UNITED STATES PATENTS

| 3,186,184 | 6/1965 | Pruitt........................... | 62/323 |
| 3,462,964 | 8/1969 | Haroldson.................... | 62/323 |

Primary Examiner—Meyer Perlin
Attorney—Ostrolenk, Faber, Gerb & Soffen

ABSTRACT: Energization and deenergization of the magnetic clutch coupling an air conditioner compressor to an automobile engine is controlled automatically by a vacuum switch responsive to the vacuum level in the intake manifold.

INVENTOR.
HENRY B. KAYE
BY
Ostrolenk, Faber, Gerb & Soffen
ATTORNEYS

AUTOMATIC CONTROL FOR AUTOMOTIVE AIR CONDITIONER

This invention relates to automotive air conditioners in general, and more particularly relates to means for automatically deactivating the air conditioner compressor when the acceleration demand on the automobile engine exceeds a predetermined level.

For the most part, automotive air conditioners have been installed in those automobiles with engines of relatively high power output capabilities. To a large extent, this was probably due to the high cost of the air-conditioning unit in relation to the cost of the automobile. However, even though air conditioner prices have been dropping in relation to the overall costs of an automobile, relatively few air conditioners have been installed in automobiles with engines of low power output. The latter is probably due to the fact that an air conditioner compressor requires so much power that an air conditioner will adversely affect driving performance of low powered automobiles to a significant extent.

While this problem has been recognized for some time, prior art attempts at solutions to the problem have been directed along two general lines, namely the utilization of engine speed responsive switches for automatically deactivating the air conditioner compressor when engine speed fell below a predetermined speed and the utilization of acceleration pedal operated switches to deactivate the compressor when the pedal was positioned in one or more of its operating positions, typically idle and full throttle positions.

Neither of the foregoing approaches to the problem of air conditioner compressor operation from relatively low powered automotive engines addresses itself to the heart of the situation which appears to be disconnecting the compressor only when power available from the engine to drive the compressor falls below a predetermined level, as during conditions when rapid vehicle acceleration is demanded.

In accordance with the instant invention, the air conditioner compressor is deactivated through the operation of a vacuum switch connected to the intake manifold of the engine. Under conditions of rapid acceleration, the degree of vacuum in the manifold decreases and the switch is automatically operated to open condition to deactivate the compressor. As automobile speed increases, its momentum increases and engine load decreases until a point is reached where manifold pressure decreases (increased vacuum) to a level whereat the switch closes and the compressor is activated.

Accordingly, a primary object of the instant invention is to provide means for automatically controlling automobile air-conditioning operation as a function of the power available from the automobile engine to operate the air conditioner compressor.

Another object is to utilize the vacuum of the engine intake manifold for automatically controlling operation of the air conditioner compressor.

Still another object is to automatically deactivate the air conditioner compressor as a function of acceleration demand on the automobile engine.

These objects as well as other objects of the instant invention will become readily apparent after reading the following description of the accompanying drawings in which.

Figure 1:
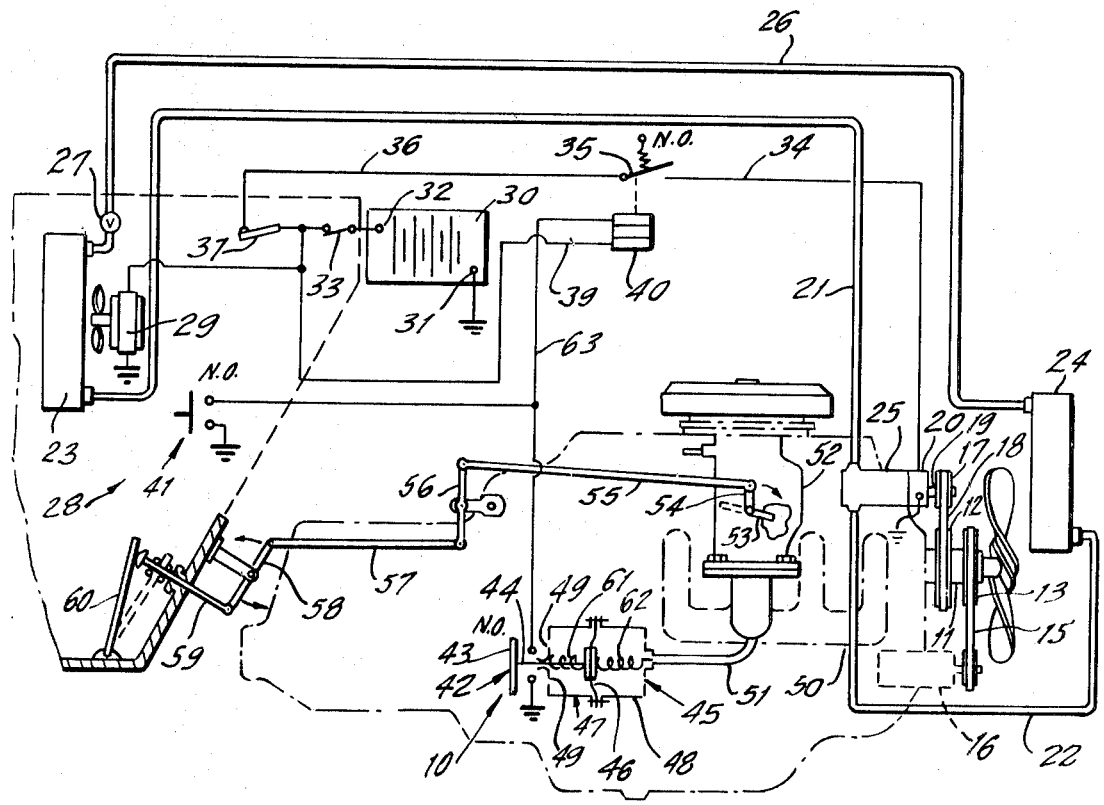
FIG. 1 is a schematic of portions of an automobile having an air-conditioning system with a control, constructed in accordance with teachings of the instant invention, for automatically activating and deactivating the air conditioner compressor.

Now referring to the Figures, and more particularly to FIG. 1. Automobile engine 10 drives output shaft 11, having pulleys 12 and 13, and fan blade 14 all keyed thereto. Pulley 13, acting through belt 15, operates generator 16, while pulley 12 drives pulley 17 through belt 18. Pulley 17 is keyed to shaft 19 of electromagnet clutch 20. When clutch 20 is actuated, it provides a driving connection between air conditioner compressor 25 to shaft 19, which in turn is drivingly connected to engine shaft 11.

Refrigerant lines 21 and 22 connect compressor 25 to evaporator 23 and refrigerant condenser 24, respectively. Refrigerant line 26, having expansion or evaporation valve 27 therein, connects evaporator 23 to condenser 24. Evaporator 23 is located within or communicates with automobile passenger compartment 28, with air circulating fan 29 being operatively positioned to force air through evaporator 23 and thereby cool passenger compartment 28.

Battery 30, for supplying ignition energy to engine 10, and charged by generator 16 in a manner known to the art, includes grounded terminal 31 and hot terminal 32. One side of fan 29 is grounded, and the other side is connected through master switch 33 to battery terminal 32. One side of clutch 20 is grounded, and the other side thereof is connected through lead 34, normally open switch 35, lead 36, thermostat switch 37 and master switch 33 to battery terminal 32.

Switch 35 is normally open and is operated to closed position through the energization of solenoid 40. Lead 39 connects one side of solenoid 40 through master switch 33 to battery terminal 32, and the other side of solenoid 40 is connected through lead 63 to paralleled normally open switches 41 and 42. Movable bridging contact 43 of switch 42 is connected to one end of insulating rod 44, having its other end connected to the central thickened portion of diaphragm 46 which constitutes the operative element of vacuum switch 45. The peripheral portion of diaphragm 46 is clamped between face-to-face cups 47, 48. Connecting rod 44 extends through a central aperture in the bottom wall of cup 47, with such wall also being provided with a plurality of holes 49 whereby the interior of cup 47 communicates with the atmosphere. Except for a central aperture in the bottom wall of cup 48, diaphragm 46 in cooperation with cup 48 forms a closed chamber connected through conduit 51 to intake manifold 50 of engine 10, for reasons to be hereinafter explained. Compression springs 61, 62, within cups 47, 48, respectively, cooperate to bias diaphragm 46 to a position wherein switch 42 is opened when equal pressures are present on both sides of diaphragm 46.

The output port of carburetor 52 is connected to intake manifold 50. Pivoted carburetor throttle valve 53 is connected through linkages 54–59 to accelerator or gas pedal 60, which controls vehicle speed.

As is well known to the art, when engine 10 is running a vacuum is present in intake manifold 50, with the vacuum level decreasing when there are sudden increases in demand for power from engine 10, as during periods of automobile acceleration. The greater the rate of the acceleration demanded, the greater will be the drop in vacuum level in manifold 50. With this in mind, it is seen that with master switch 33 and thermostat switch 37 both closed, clutch 20 will be energized when solenoid 40 is energized to close switch 35. Solenoid 40 is energized when manually operated override switch 41 is maintained in closed position. Solenoid 40 is also energized when vacuum switch contacts 42 are engaged. The latter occurs when there is a sufficiently high vacuum present in manifold 50.

This sufficiently high vacuum is present for most operating conditions of engine 10, including idling thereof. However, a sudden major change in the position of accelerator pedal 60, either during a fast start of the automobile from a standing position or on demand for rapid acceleration when passing another vehicle, causes the vacuum level in manifold 50 to drop (move toward atmospheric pressure). When this level of vacuum is sufficiently low, spring 62 forces the contacts of switch 42 to disengage, thereby deenergizing clutch 20 to disengage the load of compressor 25 from engine 10, thereby increasing the available power from engine 10 to meet the acceleration demands then being made thereon. When it is desired to operate compressor 25 continuously regardless of acceleration demands being made on engine 10, override switch 41 within passenger compartment 28 is manually closed, thereby bypassing vacuum operator switch 42.

Figure 2:
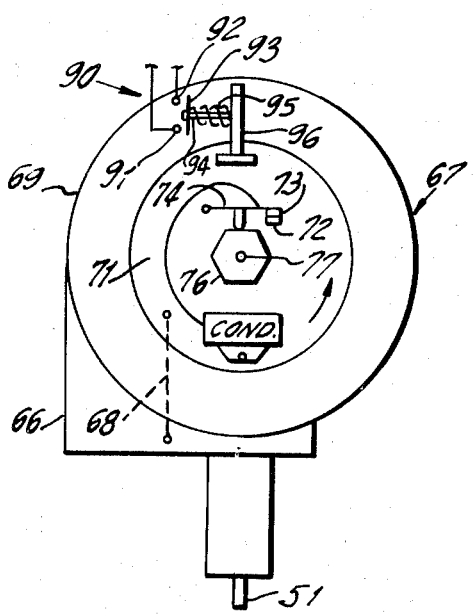
FIGS. 2 and 3 are schematics showing different embodiments for vacuum operated switches which may be substituted for the vacuum operated switch illustrated in FIG. 1.
Figure 3:
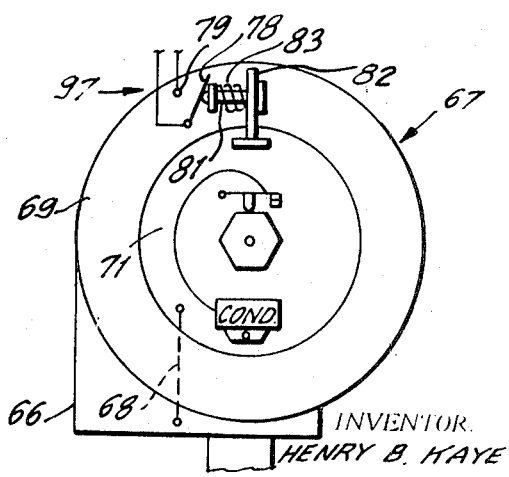

FIGS. 2 and 3 illustrate vacuum operated switch mechanisms which may be substituted for vacuum switch 45 and its contact mechanism 42. In particular, FIGS. 2 and 3 illustrate vacuum spark advance unit 66, mounted to the exterior of distributor 67 (only partially illustrated). Link 68 extends from spark advance 66 through stationary wall 69 of the distributor housing and is connected to rotatable plate 71 having breaker points 72, 73 mounted thereon. The greater the vacuum applied through conduit 51 to spark advance 66, the greater will be the counterclockwise movement of distributor plate 71 and the later in the cycle will be the opening of points 72, 73. Movable point or contact 73 is mounted to one end of spring arm 74, having central extension 75 biased into engagement with the periphery of hexagonal operating cam 76, driven through the rotation of shaft 77. The latter is drivingly connected to the crankshaft of engine 10.

Stationary contacts 91, 92 of switch 90, which is to replace switch 42, are mounted to distributor housing 69. Bridging contact 93 is slidably mounted to rod 94, and is biased toward the left end thereof by compression spring 95. The right end of rod 94 is connected to bracket 96 which is fixedly secured to rotatable plate 71 to move in unison therewith. Thus, as the level of vacuum in conduit 51 rises to a point where the pressure drops below a predetermined level, switch 90 closes and clutch 20 will be energized at those times when master switch 33 and thermostat switch 37 are both closed.

In the embodiment of FIG. 3, pivoted movable contact 78 as well as stationary contact 79 of switch 97 are mounted to distributor housing 69. Movable contact 78 is operated by rod 81, slidably mounted to bracket 82 and biased toward the left by compression spring 83. Bracket 82 is fixedly secured to rotatable plate 71 to move in unison therewith and operate switch 97 in a manner similar to the operation of switch 90 by movement of bracket 96.

Thus, it is seen that the instant invention provides means for automatically interrupting the driving connection between an automobile engine and an air conditioner when demands on the engine exceed predetermined levels as during conditions when rapid acceleration is demanded. For economy and simplicity of construction, the instant invention requires the mere addition of a vacuum switch whose operation is under the control of the vacuum developed by the automobile engine.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows.

1. In combination, an internal combustion engine for an automobile; a throttle to control fuel flow to said engine; refrigeration apparatus for cooling the passenger compartment of an automobile including a refrigerant compressor; clutch means operable to drivingly connect said compressor to said engine to be driven by the latter; said engine including an intake manifold and a vacuum generator means for producing a vacuum in said intake manifold; automatic means connected to said vacuum generator means to automatically activate and deactivate said clutch means as a function of acceleration demand on said engine in accordance with the vacuum level generated by said vacuum generator means and derived from the relationship between throttle setting and actual load on said engine; said vacuum generator means generating a greater vacuum level as acceleration demand decreases; said clutch means being electrically energized; said automatic means including a pressure actuated switch connected in an energizing circuit for said clutch means; said switch being operated in response to the vacuum level generated by said vacuum generator means; said switch normally being open and being closed when the vacuum level generated by said vacuum generator means exceeds a predetermined value; a spark-generator and distributor for controlling ignition of fuel in said engine, and including a vacuum operated spark advance means connected to the intake manifold for operation in accordance with the vacuum level in said manifold; said spark generator and distributor including a fixed part and a movable part operated by said spark advance means; said movable part operating said switch closed when the vacuum level generated by said vacuum generator means exceeds the predetermined value.

2. The combination as set forth in claim 1, in which the switch includes separable contacts, one mounted to said stationary part and the other mounted to said movable part.